Feb. 12, 1924. 1,483,302
A. B. HANNA
CASTER
Filed Oct. 14, 1922
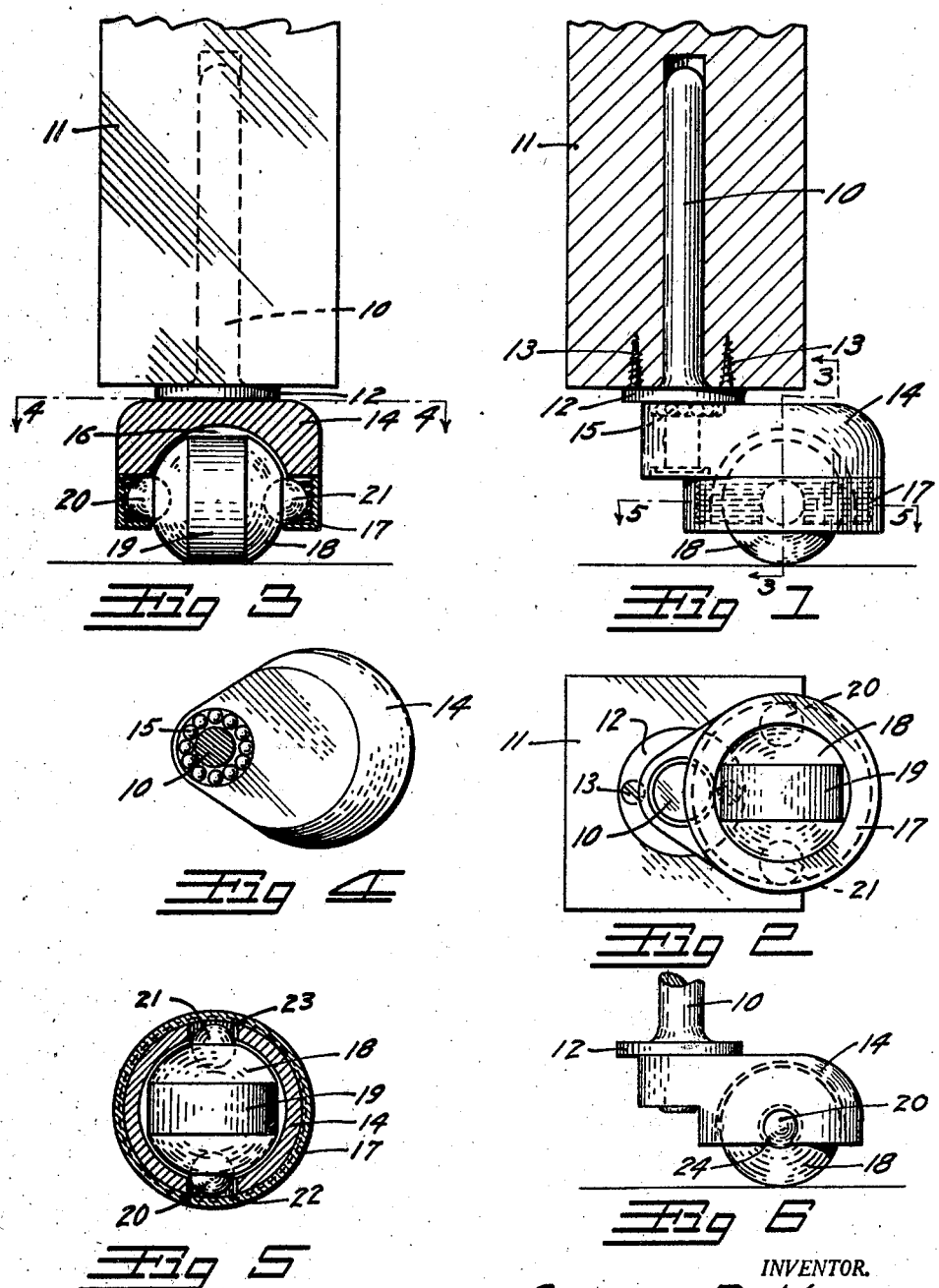
INVENTOR.
ALBERT B. HANNA
BY
ATTORNEY.

Patented Feb. 12, 1924.

1,483,302

UNITED STATES PATENT OFFICE.

ALBERT B. HANNA, OF DENVER, COLORADO.

CASTER.

Application filed October 14, 1922. Serial No. 594,600.

*To all whom it may concern:*

Be it known that I, ALBERT B. HANNA, a citizen of the United States of America, residing at Denver, in the county of Denver and State of Colorado, have invented certain new and useful Improvements in Casters, of which the following is a specification.

This invention relates to ball bearing furniture casters and has for its principal object the provision of a caster of this character, which will not bind or cramp, regardless of the direction in which it is moved.

Another object of the invention is to provide a caster which will revolve with a minimum of friction and will not require excessive lubrication.

A further object of the invention is to provide a caster which, while highly efficient, can be cheaply and easily manufactured.

A still further object is to provide a caster which occupies but little space and which presents an ornamental appearance that will not detract from the artistic design of the furniture.

Other objects and advantages reside in the detailed construction of the invention, which result in simplicity, economy and efficiency, and which will become more apparent from the following description.

In the following detailed description of the invention reference is had to the accompanying drawings which form a part hereof. Like numerals refer to like parts in all views of the drawings and throughout the description.

In the drawing:—

Fig. 1 is a side elevation of the improved caster in position on a furniture leg.

Fig. 2 is a plan view of the same looking upward.

Fig. 3 is a vertical cross section taken on the line 3—3, Fig. 1.

Fig. 4 is a horizontal section taken on the line 4—4, Fig. 3, showing the ball bearings upon which the caster horizontally revolves.

Fig. 5 is a horizontal cross section taken on the line 5—5, Fig. 1.

Fig. 6 is a view of an alternate form of the invention.

Let the numeral 10 designate the caster shank which extends into an opening formed in a furniture leg 11. Shank 10 is provided near its lower extremity with a collar 12 adapted to bear against the furniture leg 11. Collar 12 is provided with screw holes in which screws 13 are placed to hold the shank 10 in position.

Rotatably mounted upon the lower extremity of the shank 10 is a caster housing 14, in which is formed a ball race, carrying ball bearings 15, which in turn bear against the collar 12 on the shank 10.

Formed in the housing 14, is a semispherical cavity 16. The outside of the housing 14, around the cavity 16, is provided with a screw thread upon which is threaded a collar 17, L shaped in cross section. A ball shaped roller 18, having a flat band 19 around its periphery, is contained within the cavity 16, and acts as a roller for the caster.

Two relatively smaller balls 20 and 21 are rotatably mounted in spherical sockets, formed in the larger ball 18, and act in the nature of a bearing shaft therefor. Notches 22 and 23 are formed in the edge of the housing 14, to receive the balls 20 and 21, and form bearings therefor. Collar 17 acts as a retainer to prevent the displacement of the balls 20 and 21.

It will be noted that the center line of the roller 18 is eccentric of the center line of the shank 10, which allows the caster to easily revolve and follow the direction of the movement of the furniture. This revolution is assisted by the ball bearings 15, upon which the weight of the furniture is carried.

The balls 20 and 21, not only revolve with the ball 18, but revolve upon it and by constantly presenting a new surface to the bearing notches 22 and 23, do not become rapidly worn away. Since the bearing balls 20 and 21 always present a spherical surface to the bearing surfaces they cannot become cramped or locked, regardless of the direction the pressure is applied upon them.

The flat band 19 prevents the caster from marring the floors as it would, were the roller a perfect sphere.

In the alternate form of caster, shown in Fig. 6, the housing is not threaded as in the first described form and the retaining ring 17 is dispensed with. In this form the bearing balls 20 and 21 are placed in notches, formed in the housing 14, and the sides and edges of the notches are upset, as shown at 24, to prevent the displacement thereof. This form has the advantage in that it can be manufactured more cheaply and is especially applicable to very small casters. The ball bearings 15 may be placed in this form if desired.

The construction and design of this caster permits it to be stained, enameled, painted, or varnished to match the finish of the furniture to which it is applied. The ordinary form of caster, consisting of a bracket and wheel, does not readily adapt itself to this form of finish.

While I have described and illustrated herein a specific form of my improvement I wish it understood that the same may be varied, within the scope of the appended claims, without departing from the spirit of the invention.

Having thus described the invention, what is claimed and desired secured by Letters Patent is:—

1. A caster comprising, a housing; a shank pivoted therein, and supported upon ball bearings on the top of said housing; a spherical cavity formed in the bottom of said housing eccentric to the axis of said shank; a ball shaped roller carried on two oppositely positioned bearing balls within said cavity, and notches formed in said housing for the reception of said bearing balls.

2. A caster comprising, a housing; a shank pivoted therein; a spherical cavity formed in the bottom of said housing to one side of said shank; a ball shaped roller carried on two oppositely positioned bearing balls within said cavity; openings formed through the lower edge of said housing for the reception of said bearing balls and a screw cap threaded on said housing to prevent the displacement of said bearing balls from said openings.

In testimony whereof I affix my signature.

ALBERT B. HANNA.